Sept. 24, 1929.    W. F. McLAUGHLIN ET AL    1,728,974
ARCUATE FILM SPLICE
Filed April 8, 1927
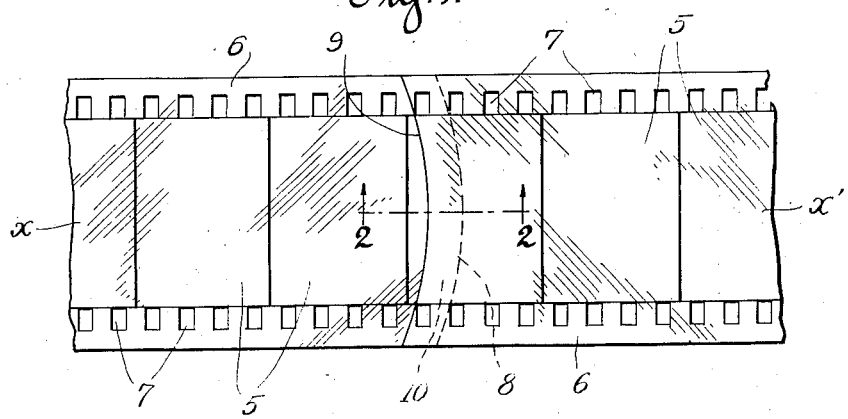
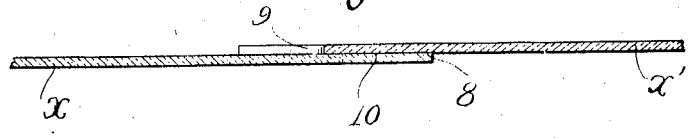

Patented Sept. 24, 1929

1,728,974

UNITED STATES PATENT OFFICE

WILLIAM F. McLAUGHLIN AND ALFRED J. SWING, OF BLOOMFIELD, NEW JERSEY, ASSIGNORS TO AUTOMATIC FILM MACHINE CORPORATION, OF NEW YORK, N. Y., A CORPORATION OF DELAWARE

ARCUATE FILM SPLICE

Application filed April 8, 1927. Serial No. 182,143.

This invention relates to moving picture and like film strips and more particularly to the joints connecting between sections of the films.

Such films are necessarily made of translucent material, such as celluloid or similar substances, of very considerable length, having an emulsified surface on one side bearing a series of closely related photographs arranged contiguously in intimate relation and provided with blank margins containing uniformly spaced perforations to be engaged by the film feeding mechanism.

Such material, while fairly tough, is frequently carried around rolls of small diameter, the film bending at an inconsiderable radius, causing cracks in the film which eventually breaks, this condition being intensified by reason of the marginal perforations.

Fractures are also induced by twists occurring in handling the film and by stresses to which the film may be subjected causing rupture.

These occurrences are so often met with that it is the custom to pass the film through a testing apparatus after each exhibition so as to avoid, as far as possible, the hazard of having the film separate during its succeeding showing.

As the several pictures consecutively displayed are so nearly repetitions with slight variations, the retirement of a limited number of contiguous pictures is not missed, which fact is taken advantage of in repairing a fracture or completely broken apart film by cutting out the damaged portion and uniting the ends.

Splicing or mending operations usually consist of severing the film by cutting straight across, cleaning the emulsion from the face of the film, employing cement, overlapping the ends and applying pressure while adhesion takes place.

Such joints have certain disadvantages, as for instance, in passing around small rolls the entire strain is brought to bear on a line at a right angle to the film at both edges of the splice, frequently causing the adhesive to separate and the joint to open.

It is therefore the main purpose of the present invention to produce a lap joint for films less liable to rupture than ordinarily by reason of presenting arcuately end edges at both ends of the seam.

A further feature is that, due to the curved edges of the surfaces in contact, a greater area is presented to receive cement than can be obtained by straight cut ends overlapped to the same amount.

In order to clearly understand the invention a detailed description follows to be taken in connection with the accompanying drawing, in which:

Fig. 1 is a fragmentary plan view of a conventional strip of picture film showing the improved joint.

Fig. 2 is a greatly enlarged sectional view taken on line 2—2 of Fig. 1.

In the film X—X' illustrated, the numeral 5 designates the spaces on which the pictures appear, the same being oblong rectangles in plan having at their ends continuous margins 6 containing perforations 7.

In splicing the broken or otherwise injured film ends it is preferred to place the damaged portions at each end in overlapping relation, clamping the same to prevent movement and cause the blade of a knife to move in an arcuate path through the overlapped portions.

This cutting action produces a convex edge 8 on one end of the film portion X and a correspondingly concave edge 9 on the end of the film portion X', which, when scraped, cemented and moved into superposed relation, presents a curved seam 10 of no greater width than is ordinary but obviously having an increased superficial area.

The radius of the cut edges 8 and 9 will ordinarily be the same but this radius may be varied as preferred from that shown in which the length of the radius is substantially equal to the length of the chord in any case presenting a central extending tab portion on one side as the film is advanced in one direction and opposed elements at the ends of the edge 9 when moved in an opposite direction.

It has been experimentally demonstrated that a lapped joint made in the manner disclosed is appreciably stronger and less liable to separate than a joint in which the edges are cut squarely across, and constitutes a distinct advance in the art.

Although the foregoing is descritive of the best known embodiment of the invention, it is not desired to be confined to the exact construction shown as changes in curvature, extent of overlap and like minor matters may be made without conflicting with the general intent of the appended claims.

We claim:

1. An arcuate film splice for repairing breaks in motion picture film, wherein the two ends of the film are arcuately cut to form convex and concave ends which ends are brought into overlapping relation and cemented together.

2. An arcuate film splice for motion picture films wherein the two ends of the film are cut on convex and concave lines, respectively, the two cuts being on arcs of substantially the same radius, the cut ends being overlapped and cemented together.

3. An arcuate film splice for motion picture films wherein the two ends of the film are cut on convex and concave lines, respectively, the two cuts being on arcs of substantially the same radius, the chord of either of said arcs being substantially equal to the width of the film, the cut ends being overlapped and cemented together.

In testimony whereof we have affixed our signatures.

WILLIAM F. McLAUGHLIN.
ALFRED J. SWING.